Oct. 31, 1933.    H. M. KEEBLER ET AL    1,933,062
ELECTRIC SWITCH
Filed March 20, 1930    2 Sheets-Sheet 2
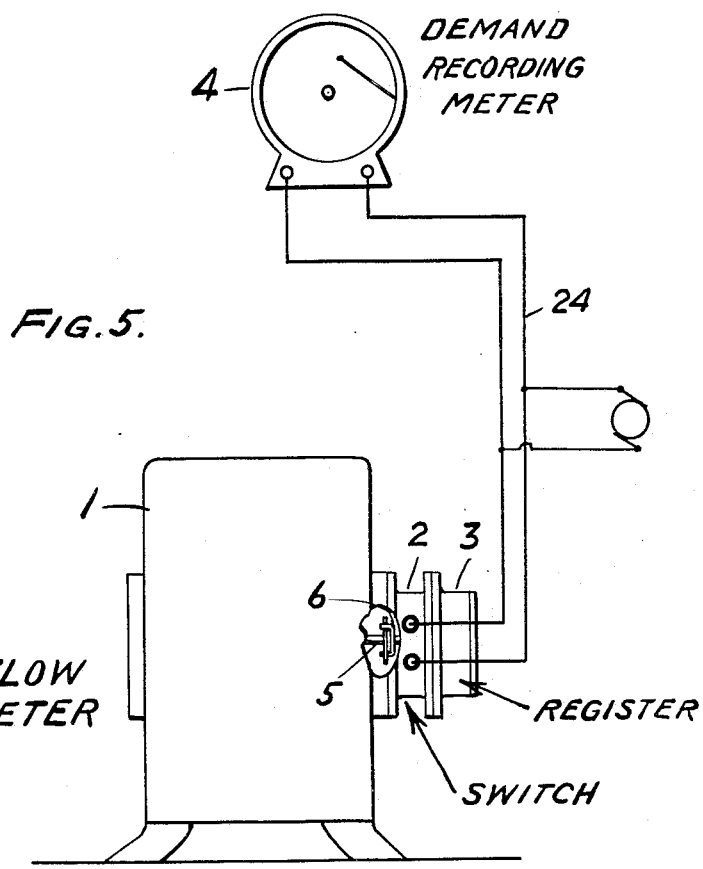
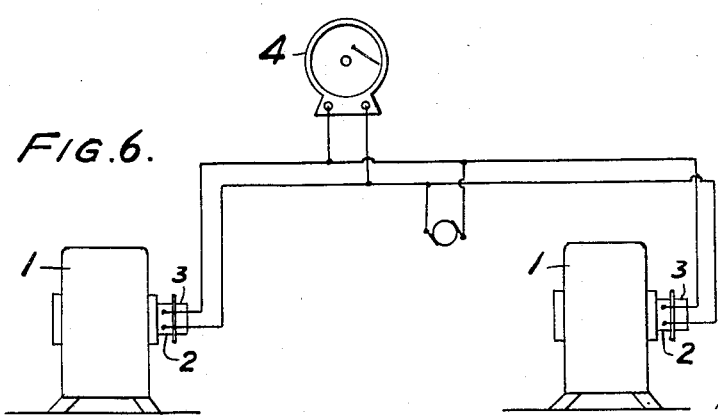

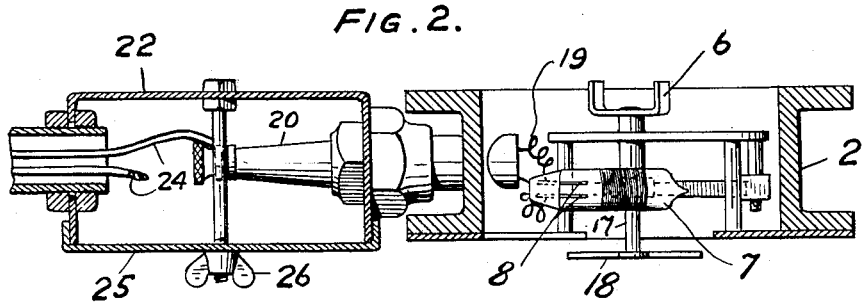
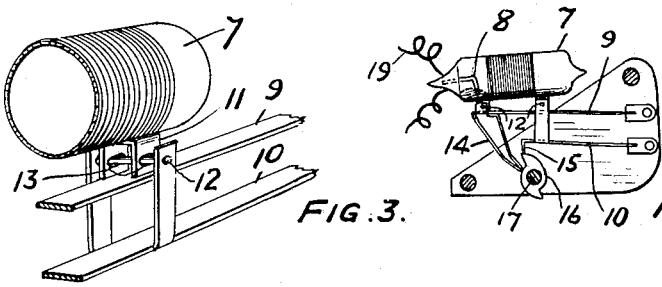
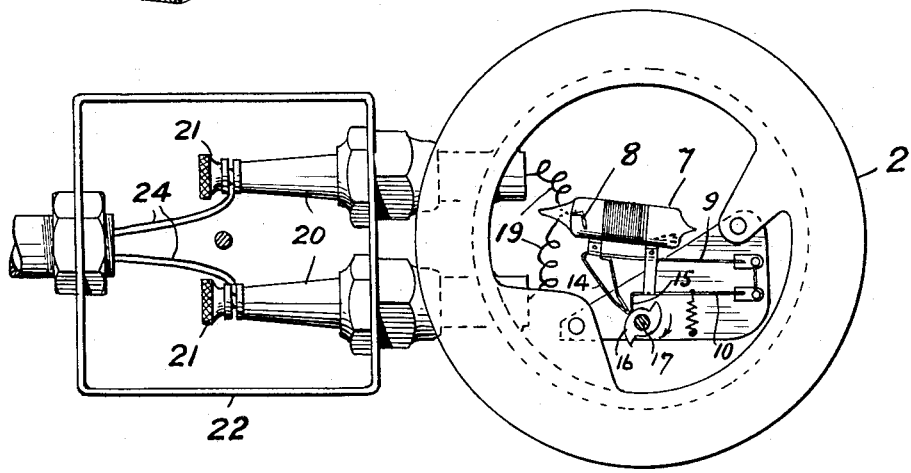

Patented Oct. 31, 1933

1,933,062

UNITED STATES PATENT OFFICE 1,933,062

ELECTRIC SWITCH

Howard Marshall Keebler, Norwood, and Frederick Strattner, Lansdowne, Pa.

Application March 20, 1930. Serial No. 437,567

4 Claims. (Cl. 200—153)

The device which forms the subject matter of our invention is an electrical system for obtaining a graphic or integrated record of the movements of a revolving or reciprocating shaft or other mechanism.

One of the applications of this device is the determination of a customer's maximum demand when metering water, steam, gas or other matter. In this use it will obtain not only a record of the total flow of the liquid or gas but will also measure the maximum demand during a given period.

Our device consists of the apparatus whose movement is to be measured, for example a flow meter for measuring the flow of a gas or a liquid in a pipe, a condensate meter for measuring the flow of steam in a pipe or any similar meter. Actuated by this meter is a quick make and break electric switch which is placed in an electric circuit so as to control a demand recording or indicating meter of the electrically actuated type, such as a graphometer.

An object of our invention is to permit two or more devices, such as meters above referred to, whose movements are to be measured, to be suitably calibrated and connected to a single demand recording meter.

A still further object of our invention is to provide means whereby the delicate demand indicating or recording meter may be located at a distance from the instrument whose movement is to be measured so that the demand indicating meter is located in a convenient place free from moisture, steam, heat chemical fumes or excessive vibration.

Yet another object of our invention is to provide an electric switch which will operate under conditions of submergence in a liquid or of moisture or of vacuum.

Moreover, it is an object of our invention to provide a switch which causes a minimum of friction on the actuating shaft. By this means our device may be used on meters revolving at slow speed for which use the mechanically actuated meters of the prior art were entirely unsuitable.

For a more complete exposition of our invention reference may be had to the annexed drawings and specification at the end whereof my invention will be specifically pointed out and claimed.

In the drawings,

Figure 1 represents a side elevation of the electric switch and junction box which form a part of our invention.

Figure 2 is a longitudinal cross section through the device of Figure 1.

Figure 3 is a detailed view showing the mounting of the mercury switch.

Figure 4 is a detailed view showing the mercury switch in closed position.

Figure 5 is a diagrammatic view showing our invention as applied to a meter.

Figure 6 is a diagrammatic view showing our invention as applied to two meters.

In Figure 5 our invention is diagrammatically disclosed as applied to a meter. It is to be understood, however, that the meter is merely diagrammatic and our invention may be applied to any device having rotating or reciprocating movement of which it is desired to obtain a graphic or integrated record of the movement. To meter 1 there is shown attached a switch generally indicated at casing 2. The switch 2 is interposed between meter 1 and the customary registering apparatus thereof which is enclosed within casing 3. Electrically connected to switch 2 is a demand recording or indicating meter 4 of the electrically actuated type. Meter 1 has a shaft 5 which connects with yoke 6 of switch 2 so as to actuate the switch.

Referring now more particularly to Figures 1 to 4, inclusive, there is shown a preferred embodiment of the switch which forms part of our invention. The switch employed is merely illustrative as any type of switch which gives a quick make and a quick break action regardless of the speed of the actuating force, may be used.

Switch casing 2 contains a mercury switch or contactor 7 having a pair of contacts 8 located therein. Contactor 7 is mounted on a pair of springs 9 and 10 by means of a pair of brackets 11 of which only one is shown in Figure 3. Supports 9 and 10 may be rigidly mounted or may be pivotally mounted on pins or other pivots. Fastened to arms which are integral with supports 9 and 10 are a pair of pins 12 which pass through the brackets 11. The righthand bracket 11 has elongated slots 13 therein to allow for the movement of contactor 7 about the different centers of supports 9 and 10. Also integral with supports 9 and 10 are followers 14 and 15 respectively. These cam followers rest on cam 16 which is supported on shaft 17. Shaft 17 carries at one end yoke 6 which is adapted to be actuated from the instrument whose movement is to be measured. At the other end shaft 17 carries bar 18 which may drive the actuating mechanism of the register. Attached to contacts 8 are flexible wire pigtails 19 which serve to lead the current through the switch casing 2 through the bushings 20 to switch terminals 21. Switch terminals 21 are located in junction box 22 into which a conduit for the wires 24 of the electric circuit leads. Junction box 22 is provided with a cover 25 which may be fastened in place by a wingnut 26 or other means and then sealed in place to prevent tampering with the meter. As is seen from Figures 2 and 5, switch casing 2 is adapted to be bolted or otherwise fastened to the cover the meter or other instrument whose movement is to be measured in such a position that the longitudinal axis of contactor 7 is approximately horizontal. The opposite face of switch casing 2 is closed by a cover which is conveniently formed by the register 3 of existing meters. The switch casing 2 is then sealed in place to prevent any tampering with the meter.

In Figure 6 our device is shown as applied to two instruments whose movements are to be measured. An example of such a use is two meters for a single customer who is charged at different rates. These meters are calibrated so that their combined effect may be recorded or indicated on the demand recording or indicating meter. This is done by changing the number of teeth on cam 16. Cam 16 may have one or any number of teeth thereon so that any ratio between the instruments whose movements are to be measured and combined may be obtained.

We do not intend to be limited in our invention save as the scope of the prior art and the attached claims may require.

We claim:

1. An electric switch including, the combination of a casing a vacuum tube containing mercury in said casing, contacts controlled by the mercury in the tube, a tappet cam, and a pair of spring supports connected with the tube and both adapted to ride on the high part of the tappet cam in close proximity with each other and to move in quick succession toward the center of the cam to tip the tube with a quick motion and to return it.

2. An electric switch including a gas and moisture-tight casing, a mercury switch in said casing, a cam for actuating said switch, a pair of supports connected with the mercury switch and adapted to ride on the high part of the cam in close proximity to each other and to move in quick succession towards the center of the cam to tip the mercury switch with a quick movement and to return it.

3. An electric switch including in combination a tubular casing having open ends, flanges on said casing surrounding said open ends for atttaching said casing to other members and thereby closing it, said flanges providing for gas and moisture tight joints, a pair of springs mounted in said casing and spaced apart, arms integral with said springs, pins mounted on said arms, brackets mounted on said pins, one of said brackets having elongated slots in it to receive a pin therein, a mercury switch mounted on said brackets contacts for said switch, a shaft in said casing, means for actuating said shaft on it adjacent one open end of said casing, means for transmitting the movement of said shaft on the opposite end of it adjacent the opposite open end of said casing, a cam on said shaft having portions rising gradually to a high point and dropping immediately to a low point, and followers on each of said springs riding on said cam adjacent each other so that one follower falls causing closing of said mercury switch closely followed by the other follower falling causing opening of said mercury switch.

4. An electric switch including a support, a pair of leaf springs mounted on said support and spaced from each other, a mercury switch mounted on said springs, a cam mounted adjacent said springs, and followers on said springs riding on said cam closely adjacent each other to cause closing of said switch and reopening of said switch upon short successive movements of said cam.

HOWARD MARSHALL KEEBLER.
FREDERICK STRATTNER.